(12) United States Patent
Knodle et al.

(10) Patent No.: US 6,368,224 B1
(45) Date of Patent: Apr. 9, 2002

(54) SEALING ASSEMBLY FOR CONSTANT VELOCITY JOINT

(75) Inventors: Jeffrey M. Knodle, Ida; James A. Duggan, Temperance, both of MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 09/477,787

(22) Filed: Dec. 31, 1999

Related U.S. Application Data

(60) Provisional application No. 60/114,339, filed on Dec. 31, 1998.

(51) Int. Cl.[7] .................................................. F16D 3/16
(52) U.S. Cl. ........................ 464/146; 464/170; 464/177; 277/635; 403/23
(58) Field of Search ................................ 277/634, 635, 277/637; 464/170, 171, 177, 172; 403/23

(56) References Cited

U.S. PATENT DOCUMENTS

| | | | |
|---|---|---|---|
| 4,605,332 A | * | 8/1986 | Mayhew et al. ............... 403/23 |
| 4,610,559 A | * | 9/1986 | Mayhew et al. ............... 403/23 |
| 4,627,826 A | | 12/1986 | Juziuk et al. |
| 4,664,393 A | | 5/1987 | Hazebrook |
| 5,007,881 A | | 4/1991 | Hazebrook |
| 5,230,660 A | * | 7/1993 | Warnke ....................... 277/634 |
| 5,297,996 A | | 3/1994 | Draga |
| 5,346,431 A | * | 9/1994 | Okuyama et al. ........... 464/171 |

\* cited by examiner

*Primary Examiner*—Lynne H. Browne
*Assistant Examiner*—Aaron Dunwoody
(74) *Attorney, Agent, or Firm*—MacMillan, Sobanski & Todd, LLC

(57) ABSTRACT

A constant velocity type of universal joint includes a sealing structure that avoids the use of a flexible boot. The constant velocity joint includes a hollow outer joint member, an inner joint member disposed within the outer joint member, and a plurality of ball bearings extending into associated grooves formed in the inner and outer joint members to provide a rotational driving connection therebetween. A sealing assembly is provided for protectively enclosing the components of the joint. The sealing assembly includes an outer sealing member that is sealingly connected to the outer joint member. An outer surface of an inner sealing member is slidably and sealingly engaged with an inner surface of the outer sealing member. An annular flange provided on the inner sealing member slidably and sealingly engages an outer surface of an annular element. An inner surface of the annular element slidably and sealingly engages a shaft connected to the inner joint member. The outer sealing member, the inner sealing member, and the annular element cooperate to form a protective enclosure for the various components of the joint. A biasing element can be provided to positively urge the inner sealing element into sealing engagement with the outer sealing element. The protective enclosure is effective to prevent dirt, water, and other contaminants from contacting the various components of the joint, and to retain lubricant therein for such components.

6 Claims, 3 Drawing Sheets

SEALING ASSEMBLY FOR CONSTANT VELOCITY JOINT

CROSS REFERENCE TO RELATED APPLICATION

This application claims the benefit of U.S. Provisional Application No. 60/114,339, filed Dec. 31, 1998, the disclosure of which is incorporated herein by reference.

BACKGROUND OF THE INVENTION

This invention relates to universal joints for providing a rotational driving connection between two rotatable shafts, while allowing such shafts to be oriented at an angle relative to one another. More particularly, this invention relates to a constant velocity type of universal joint having an improved sealing structure that avoids the use of a flexible boot.

A universal joint is a well known mechanical coupling device that provides a rotational driving connection between two rotatable shafts, while permitting such shafts to be oriented at an angle relative to one another. Universal joints are commonly used in the drive train systems of vehicles. For example, universal joints are often used to rotatably connect a driveshaft tube between an output shaft of an engine/transmission assembly or other source of rotational power and an input shaft of an axle assembly including a pair of driven wheels. In such a vehicular drive train assembly, the rotational axes of the output shaft of the engine/transmission assembly, the driveshaft tube, and the input shaft of the axle assembly are rarely co-axially aligned. To accommodate this, a first universal joint is connected between the output shaft of the engine/transmission assembly and a first end of the driveshaft tube, while a second universal joint is connected between a second end of the driveshaft tube and the input shaft of the axle assembly. Universal joints are also commonly used to provide a rotational driving connection between the axle shafts and the driven wheels of the axle assembly.

Universal joints are commonly classified by their operating characteristics. One important operating characteristic relates to the relative angular velocities of the two shafts connected thereby. In a constant velocity type of universal joint, the instantaneous angular velocities of the two shafts are always equal, regardless of the relative angular orientation between the two shafts. In a non-constant velocity type of universal joint, the instantaneous angular velocities of the two shafts vary with the angular orientation (although the average angular velocities for a complete rotation are equal).

A typical constant velocity universal joint includes a cylindrical inner race that is connected to one of the shafts and a hollow cylindrical outer race that is connected to the other of the shafts. The outer surface of the inner race and the inner surface of the outer race have respective pluralities of grooves formed therein. Each groove formed in the outer surface of the inner race is associated with a corresponding groove formed in the inner surface of the outer race. A ball is disposed in each of the associate pairs of grooves. The balls provide a driving connection between the inner and outer races. An annular cage is typically provided between the inner and outer races for retaining the balls in the grooves. The cage is provided with a plurality of circumferentially spaced openings for this purpose.

As is well known, the above-described components of the constant velocity universal joint are usually disposed within a protective enclosure to prevent dirt, water, and other contaminants from interfering with the operation thereof. Typically, this protective enclosure has been embodied as a boot formed from a flexible material, such as rubber or other elastomeric material. The flexible material accommodates articulation or relative angular movement between the shafts connected to the inner and outer races of the joint, while maintaining a seal therebetween. Flexible boots of this general type are well known in the art for performing this function and have been found to perform satisfactorily in a variety of constant velocity universal joint structures at a reasonable cost for many years.

However, several drawbacks have been noted with respect to the use of conventional flexible boots in constant velocity universal joints. For example, flexible boots are relatively soft and, therefore, subject to puncture when impacted by stones or other objects encountered during operation of the vehicle. Flexible boots are also subject to degradation resulting from repeated flexing and exposure to chemicals and the elements during use. Also, flexible boots having a conventional convoluted configuration generally require a relatively large volume of lubricant to properly lubricate the constant velocity universal joint contained therein. All of these factors tend to limit the useful lifespan of the flexible boot. Thus, it would be desirable to provide a constant velocity universal joint having an improved sealing structure that avoids the use of a conventional flexible boot.

SUMMARY OF THE INVENTION

This invention relates to a constant velocity type of universal joint having an improved sealing structure that avoids the use of a flexible boot. The constant velocity joint includes a hollow outer joint member, an inner joint member disposed within the outer joint member, and a plurality of ball bearings extending into associated grooves formed in the inner and outer joint members to provide a rotational driving connection therebetween. A sealing assembly is provided for protectively enclosing the components of the joint. The sealing assembly includes an outer sealing member that is sealingly connected to the outer joint member. An outer surface of an inner sealing member is slidably and sealingly engaged with an inner surface of the outer sealing member. An annular flange provided on the inner sealing member slidably and sealingly engages an outer surface of an annular element. An inner surface of the annular element slidably and sealingly engages a shaft connected to the inner joint member. The outer sealing member, the inner sealing member, and the annular element cooperate to form a protective enclosure for the various components of the joint. A biasing element can be provided to positively urge the inner sealing element into sealing engagement with the outer sealing element. The protective enclosure is effective to prevent dirt, water, and other contaminants from contacting the various components of the joint, and to retain lubricant therein for such components.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
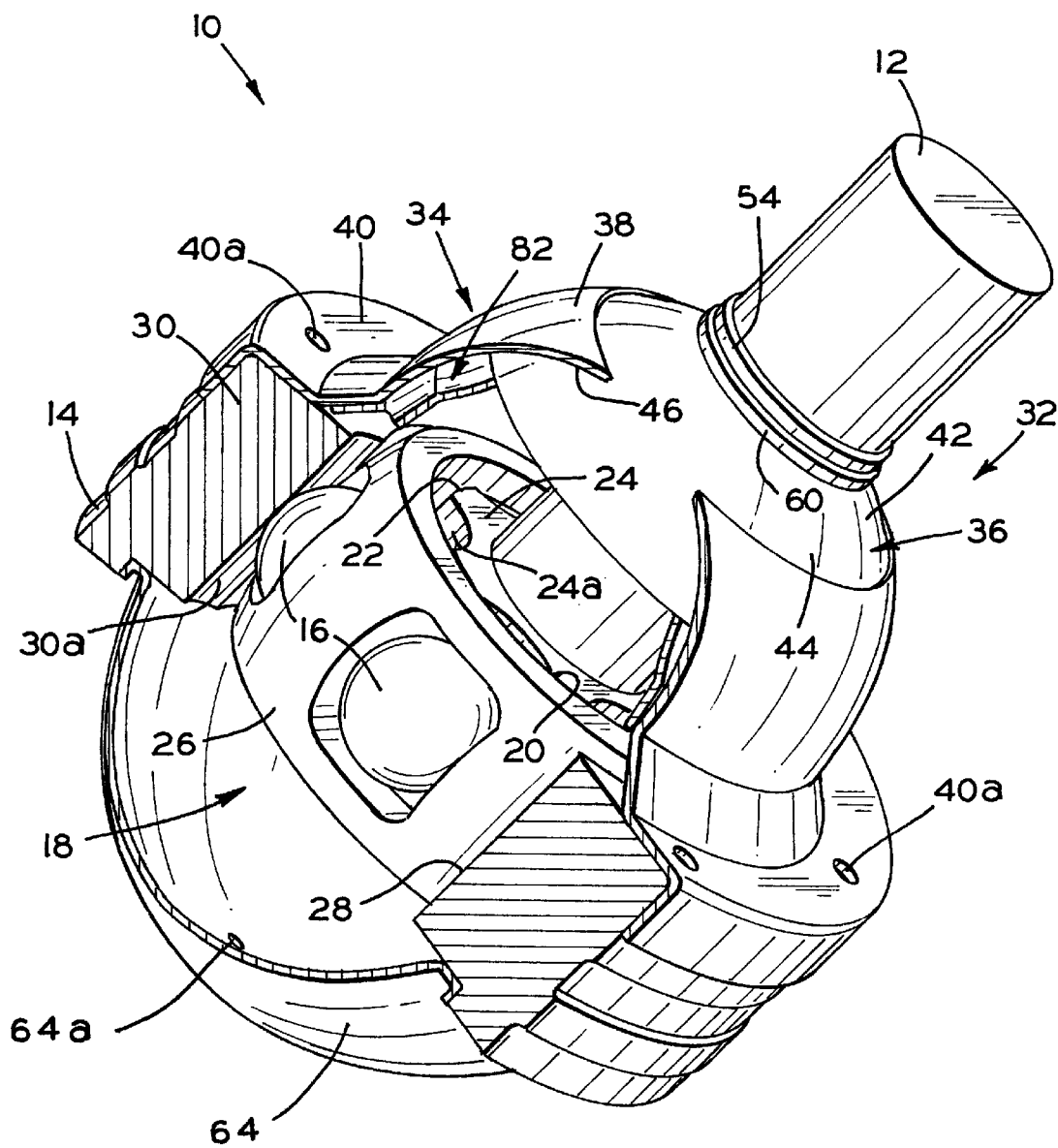
FIG. 1 is a perspective view, partially broken away, of a constant velocity universal joint in accordance with this invention.
Figure 2:
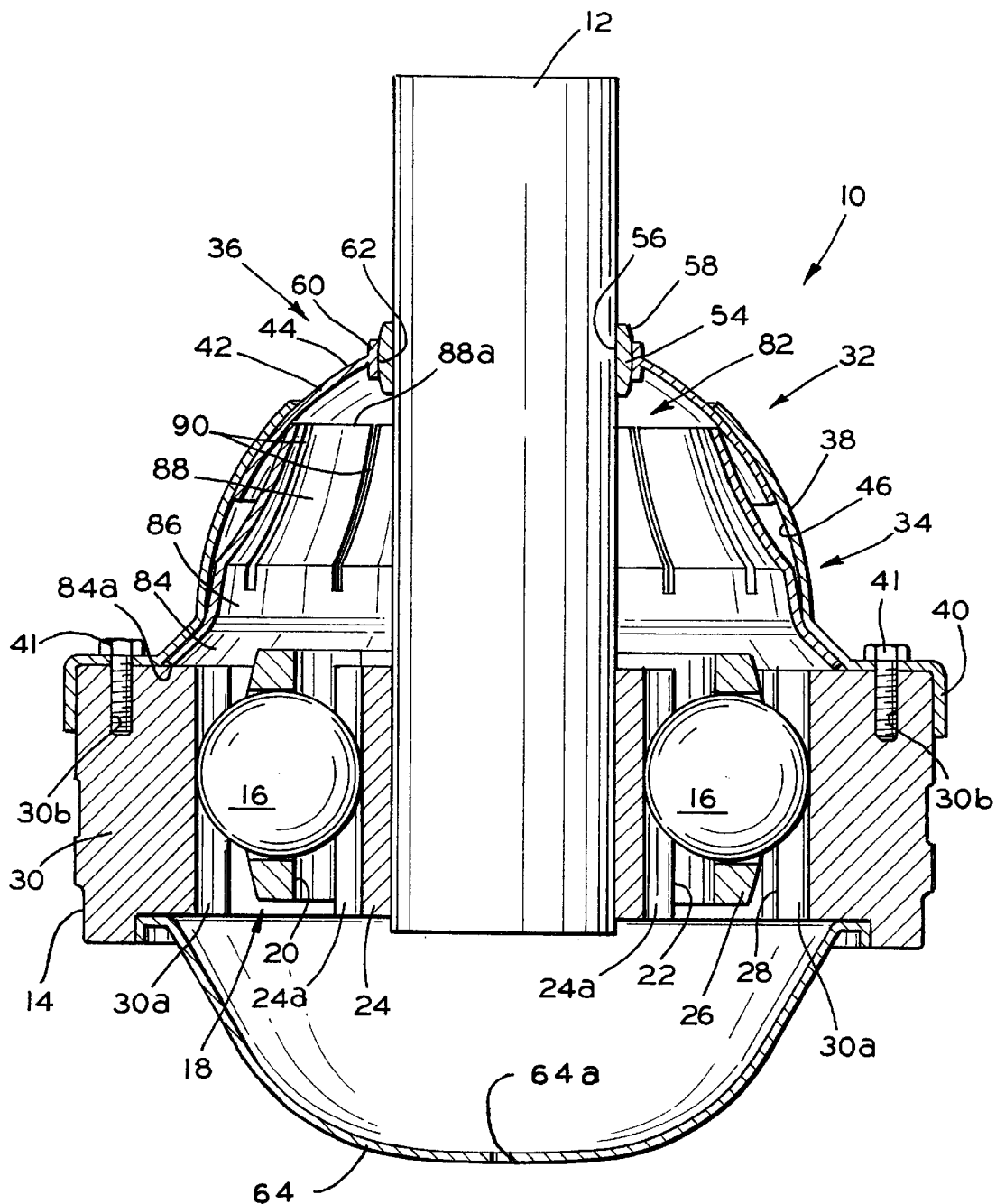
FIG. 2 is an enlarged sectional elevational view of the constant velocity universal joint illustrated in FIG. 1.

Referring now to the drawings, there is illustrated in FIGS. 1 and 2 a constant velocity universal joint, generally indicated at 10, in accordance with this invention. The illustrated joint 10 is provided to rotatably connect a first shaft 12 to a second shaft (not shown), while allowing a limited amount of angular articulation therebetween. The second shaft may, for example, be connected to a flange 14 provided at an end of the joint 10 opposite to the first shaft 12. However, the two shafts may be connected to the components of the joint 10 in any desired manner. As is well known, the joint 10 is structured and configured to transmit a rotational force from one of the shafts to the other. Thus, one of the shafts functions as an input shaft and can be connected to a source of rotational power so as to transmit a rotational force through the joint 10 to the other shaft, which can be connected to a rotatably driven device.

The first shaft 12 is connected to an inner joint member 24 of the joint 10 for rotation therewith. The first shaft 12 may, for example, be splined to the inner joint member 24 in a well known manner. The inner joint member 24 has a plurality of grooves 24a (only one is illustrated in FIG. 1) formed in the outer surface thereof. A ball bearing 16 is disposed in each of the grooves 24a formed in the outer surface of the inner joint member 24. The balls 16 are maintained in the grooves 24a by a bearing cage, indicated generally at 18. The bearing cage 18 has an inner surface 20 and an outer surface 26. If desired, the inner surface 20 of the bearing cage 18 can be formed having a generally spherical shape that engages a complementary spherical outer surface 22 formed on the inner joint member 24. When so engaged, the bearing cage 18 is piloted on the inner joint member 24 so as to prevent relative axial movement therebetween.

The joint 10 further includes an outer joint member 30 having a plurality of grooves 30a (only one is illustrated in FIG. 1) formed in the inner surface thereof. A ball bearing 16 is disposed in each of the grooves 30a formed in the inner surface of the outer joint member 30. If desired, the outer surface 26 of the bearing cage 18 can be formed having a generally spherical shape that engages a complementary spherical inner surface 28 formed on the outer joint member 30. When so engaged, the bearing cage 18 is piloted on the outer joint member 30 so as to prevent relative axial movement therebetween. Thus, it can be seen that rotational force can be transmitted from the outer joint member 30 through the ball bearings 16 and the inner joint member 24 to the shaft 12, or vice versa. A plurality of threaded bores 30b (see FIG. 2) are formed in the flange 14 of the outer joint member 30 for a purpose that will be explained below.

As is well known in the art, the shaft 12 and the flange 14 are subject to articulation or angular movement relative to one another while transmitting rotational torque therebetween. Additionally, in some instances, the joint 10 must be capable of accommodating a certain amount of relative axial movement between the shaft 12 and the flange 14. To facilitate these movements, the various components of the joint 10 must be lubricated and maintained free from contaminants, such as dirt, water, and the like. To this end, the joint 10 has been traditionally provided with a flexible boot that extended from a first end secured to the shaft 12 to a second end secured to the flange 14. Frequently, the flexible boot was formed having a plurality of corrugations to facilitate the flexing movement thereof when the shaft 12 and the flange 14 were articulated relative to one another. However, such flexible boots have been found to be prone to degradation and premature failure, especially when the joint 10 is operated in relatively harsh environments.

To address this, this invention contemplates that the traditional flexible boot be replaced by a sealing assembly, indicated generally at 32, to protectively cover the various components of the joint 10 and to retain lubricant therein. The sealing assembly 32 of this invention includes an outer sealing member, indicated generally at 34. The outer sealing member 34 includes a generally semi-spherical portion 38 and a flange portion 40. The semi-spherical portion 38 of the outer sealing member 34 extends about, but does not engage, the shaft 12. The flange portion 40 of the outer sealing member 36 engages and seals against the outer joint member 30 adjacent to the flange 14. A plurality of apertures 40a are formed through the flange portion 40 of the outer sealing member 36. The apertures 40a are positioned to be axially aligned with the threaded bores 30b formed in the flange 14 of the outer joint member 30. Threaded fasteners 41 can extend through the apertures 40a formed through the flange portion 40 of the outer sealing member 34 into threaded engagement with the threaded bores 30b formed in the outer joint member 30 to secure the outer sealing member 34 to the outer joint member 30. Thus, it can be seen that the outer sealing member 34 is sealingly connected to the outer joint member 30 for movement therewith.

The sealing assembly 32 of this invention also includes an inner sealing member, indicated generally at 36. The inner sealing member 36 includes a generally semi-spherical portion 42 having an outer surface 44. The outer surface 44 of the inner sealing member 36 is generally complementary in shape with an inner surface 46 of the semi-spherical portion 38 of the outer sealing member 34. Thus, the outer surface 44 of the inner sealing member 36 slidably and sealingly engages the inner surface 46 of the outer sealing member 34. In this way, the inner sealing member 36 is free to move angularly relative to the outer sealing member 34 as the shaft 12 is articulated relative to the flange 14, as will be described further below. The inner sealing member 36 further includes has an open end that is defined by an annular flange 60. The annular flange 60 is preferably formed integrally with the semi-spherical portion 42 and includes an arcuately-shaped inner surface 62. The purpose for the arcuately-shaped inner surface 62 will be explained below.

The sealing assembly 32 of this invention further includes an annular element 54 that extends between the shaft 12 and the annular flange 60 formed on the inner sealing member 36. The annular element 54 includes a cylindrical inner surface 56 that slidably and sealingly engages the cylindrical outer surface of the shaft 12. The annular element 54 further includes an arcuately-shaped outer surface 58 that slidably and sealingly engages the arcuately-shaped inner surface 62 of the annular flange 60 of the inner sealing member 36. Thus, it can be seen that the annular element 54 is sealingly connected to the shaft 12 for movement therewith.

In operation, let it be assumed that the flange 14 of the outer joint member 30 is connected to a source of rotational power, and the shaft 12 extending from the inner joint member 24 is connected to a rotatably driven device. As discussed above, rotational force can thus be transmitted from the outer joint member 30 through the ball bearings 16 and the inner joint member 24 to the shaft 12. The outer sealing member 34 is sealingly connected to the outer joint member 30. The outer surface 44 of the semi-spherical portion 42 of the inner sealing member 36 is slidably and sealingly engaged with the inner surface 46 of the semi-spherical portion 38 of the outer sealing member 36. The arcuately-shaped inner surface 62 of the annular flange 60 of the inner sealing member 36 slidably and sealingly engages the arcuately-shaped outer surface 58 of the annular element 54. Lastly, the cylindrical inner surface 56 of the annular element 54 slidably and sealingly engages the cylindrical outer surface of the shaft 12. The outer sealing member 34, the inner sealing member 36, and the annular element 54 thus cooperate to form a portion of a protective enclosure for the various components of the joint 10. The other portion of the protective enclosure can be a closure member 64 that extends over the opposite end of the outer joint member 30. The closure member 64 can be secured to the outer joint member 30 by any conventional means, such as by a press fit or snap fit relationship in an annular recess or groove formed in the outer joint member 30. If desired, a relatively small vent hole 64a may be formed through a portion of the closure member.

The protective enclosure is effective to prevent dirt, water, and other contaminants from contacting the various components of the joint 10. The protective enclosure is further effective to retain lubricant therein for such components. Because of the sliding and sealing engagement between the outer sealing member 34 and the inner sealing member 36, and between the inner sealing member 36 and the annular element 54, the protective enclosure can easily accommodate angular articulation of the shaft 12 relative to the outer joint member 30. When this occurs, relatively sliding movement occurs between the outer sealing member 34, the inner sealing member 36, and the annular element 54. However, the sealing engagement between the outer sealing member 34, the inner sealing member 36, and the annular element 54 maintains the integrity of the protective enclosure. This sliding and sealing engagement also accommodates relative axial movement of the outer joint member 30 and the inner joint member 24 in joints 10 that are designed for such axial plunging movement.

Figure 3:
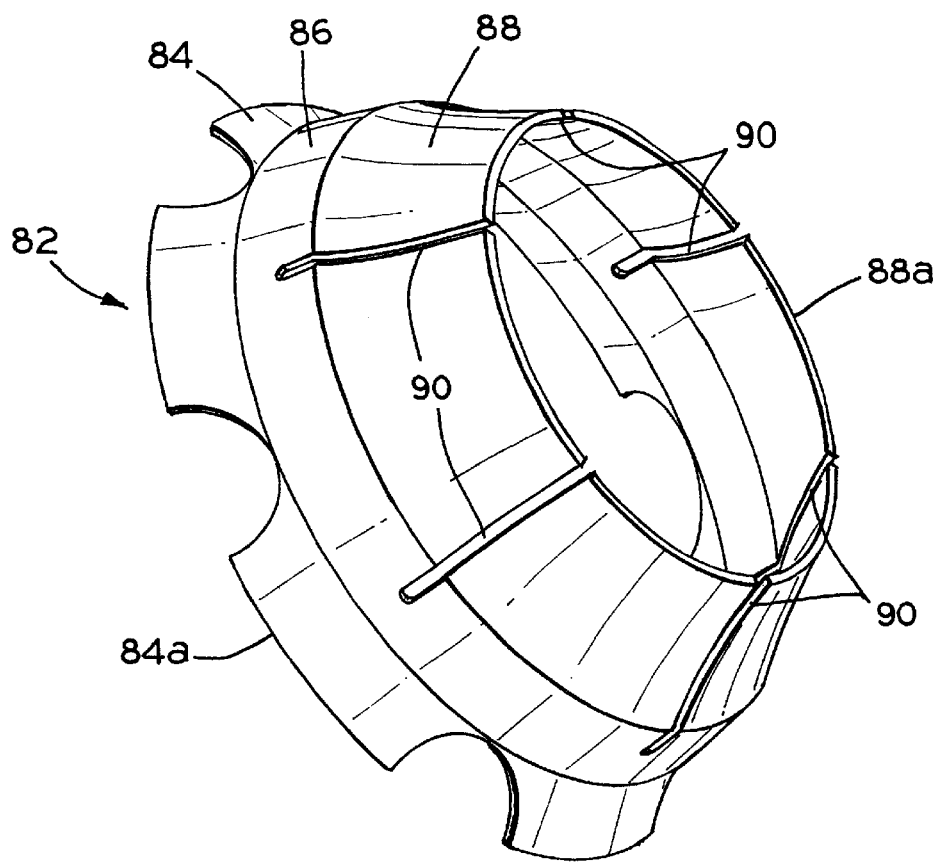
FIG. 3 is an enlarged perspective view of the biasing element of the constant velocity joint illustrated in FIGS. 1 and 2.

If desired, the sealing engagement between the outer surface 44 of the inner sealing member 36 and the inner surface 46 of the outer sealing member 34 can be enhanced by a biasing element, indicated generally at 82. The structure of the biasing element 82 is illustrated in detail in FIG. 3. The biasing element 82 is generally hollow and frusto-conical in shape, including a first tapered portion 84 having a lower edge 84a, a second tapered portion 86 extending from the first tapered portion 84, and a third tapered portion 88 extending from the second tapered portion 86 and terminating in an upper edge 88a. The outer diameters of the first tapered portion 84, the second tapered portion 86, and the third tapered portion 88 are successively smaller. A plurality of slots 90 can be provided in the second and third tapered portions 86 and 88. The slots 90 are preferably equidistantly spaced about the circumference of the biasing element 82. In the illustrated embodiment, six of such slots 90 are formed in the biasing element 82. However, a greater or lesser number of such slots 90 may be provided.

As shown in FIGS. 1 and 2, the biasing element 82 is disposed within the protective enclosure defined by the outer sealing member 34 and the inner sealing member 36. The lower edge 84a of the biasing element 82 abuts the inner side of the outer joint member 32, while the upper edge 88a thereof abuts an inner surface of the inner sealing element 36. When the sealing assembly 32 is assembled with the joint 10 as shown in FIGS. 1 and 2, the biasing element 82 is compressed between the outer joint member 30 and the inner surface of the inner sealing member 36. As a result, the biasing element 82 urges the outer surface 44 of the inner sealing member 36 outwardly into engagement with the inner surface 46 of the outer sealing member 34. As a result, the inner sealing member 36 is positively urged outwardly into sealing engagement with the outer sealing member 34. The slots 90 in the biasing element 82 provide an additional measure of resiliency to such urging.

The inner sealing member 34, the outer sealing member 36, the annular element 54, and the biasing element 82 can be formed from any desired materials. Preferably, the inner sealing member 34, the outer sealing member 36, the annular element 54, and the biasing element 82 are each formed from a relatively rigid material that is resistance to damage from wear, exposure to the elements, and the like. For example, the inner sealing member 34, the outer sealing member 36, the annular element 54, and the biasing element 82 may each be formed from metallic, plastic, or polymeric materials. If desired, the inner sealing member 34, the outer sealing member 36, the annular element 54, and the biasing element 82 may be formed from the same or different materials.

Figure 4:
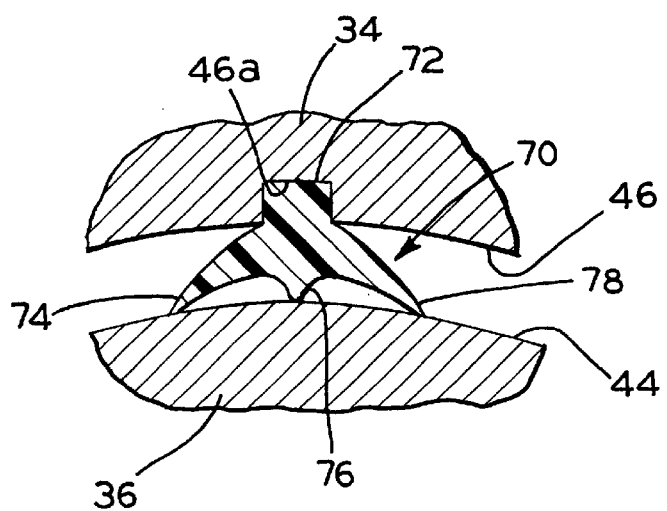
FIG. 4 is an enlarged sectional elevational view of an optional embodiment of a sealing element that can be provided in the constant velocity universal joint illustrated in FIGS. 1 and 2.

As discussed above, the outer surface 44 of the inner sealing member 36 slidably and sealingly engages the inner surface 46 of the outer sealing member 34. An alternative embodiment for a sliding and sealing structure between the outer surface 44 of the inner sealing member 36 and the inner surface 46 of the outer sealing member 34 is disclosed in FIG. 4. As shown therein, a seal, indicated generally at 70, extends between the outer surface 44 of the inner sealing member 36 slidably and the inner surface 46 of the outer sealing member 34. The seal 70 is preferably formed from a resilient material, such as an elastomeric or plastic material, and includes a base portion 72 that is received and retained within a corresponding recess 46a formed in the inner surface 46 of the outer sealing member 34. The seal 70 further includes one or more sealing lips, such as shown at 74, 76, and 78, that extend into sealing engagement with the outer surface 44 of the inner sealing member 36. The sealing lips 74, 76, and 78 slidably and sealingly engage the outer surface 44 of the inner sealing member 36 during relative movement between the outer sealing member 34 and the inner sealing member 36. If desired, a similar seal (not shown) can be provided between the arcuately-shaped inner surface 62 of the annular flange 60 of the inner sealing member 36 and the arcuately-shaped outer surface 58 of the annular element 54. Also, a similar seal (not shown) can be provided between the cylindrical inner surface 56 of the annular element 54 and the cylindrical outer surface of the shaft 12.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A constant velocity joint comprising:
   a hollow outer joint member including an inner surface having a plurality of grooves formed therein;
   an inner joint member disposed within said outer joint member, said inner joint member including an outer surface having a plurality of grooves formed therein, each of said inner race grooves being associated with an outer race groove;

a hollow cage disposed between said outer joint member and said inner joint member, said cage including a plurality of openings formed therethrough;

a ball disposed in each of said plurality of openings formed through said cage, said balls extending into said associated inner and outer joint member grooves to provide a rotational driving connection between said outer joint member and said inner joint member;

a sealing assembly including a first sealing member sealingly connected to said outer joint member and a second sealing member sealingly connected to said inner joint member, said first and second sealing members slidably and sealingly engaging one another; and a biasing element disposed completely within said first and second sealing members for urging said first and second sealing members outwardly into sealing engagement with one another.

2. The constant velocity joint defined in claim 1 wherein said biasing element is generally hollow and frusto-conical in shape.

3. The constant velocity joint defined in claim 1 wherein said biasing element includes a first tapered portion having a lower edge, a second tapered portion extending from the first tapered portion, and a third tapered portion extending from the second tapered portion and terminating in an upper edge.

4. The constant velocity joint defined in claim 3 wherein said lower edge of said biasing element abuts said outer joint member and said upper edge abuts one of said first and second sealing members.

5. The constant velocity joint defined in claim 1 wherein said biasing element includes a first tapered portion defining a first outer diameter, a second tapered portion extending from said first tapered portion and defining a second outer diameter that is smaller than said first outer diameter, and a third tapered portion extending from said second tapered portion and defining a third outer diameter that is smaller than said second outer diameter.

6. The constant velocity joint defined in claim 1 wherein said biasing element includes a first tapered portion, a second tapered portion extending from said first tapered portion, and a third tapered portion extending from said second tapered portion, wherein a plurality of slots is provided in said second and third tapered portions.

\* \* \* \* \*